United States Patent
Kuehne

(10) Patent No.: US 10,868,976 B2
(45) Date of Patent: Dec. 15, 2020

(54) METHOD FOR OPERATING SMARTGLASSES IN A MOTOR VEHICLE, AND SYSTEM COMPRISING SMARTGLASSES

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/575,689

(22) PCT Filed: Apr. 29, 2016

(86) PCT No.: PCT/EP2016/000704
§ 371 (c)(1),
(2) Date: Nov. 20, 2017

(87) PCT Pub. No.: WO2016/184541
PCT Pub. Date: Nov. 24, 2016

(65) Prior Publication Data
US 2018/0288337 A1    Oct. 4, 2018

(30) Foreign Application Priority Data

May 21, 2015    (DE) .................. 10 2015 006 612

(51) Int. Cl.
*G06T 1/00*    (2006.01)
*G06T 3/00*    (2006.01)
(Continued)

(52) U.S. Cl.
CPC ......... *H04N 5/272* (2013.01); *G02B 27/0093* (2013.01); *G02B 27/017* (2013.01);
(Continued)

(58) Field of Classification Search
CPC .. B06Q 1/00; G06T 19/00; G06T 7/00; G08G 1/166; H04N 5/272; G02B 27/0093; G02B 27/017; G02B 27/0172
(Continued)

(56) References Cited

U.S. PATENT DOCUMENTS 9,472,023 B2 * 10/2016 Sisbot .................. G06T 19/006
2010/0289632 A1 * 11/2010 Seder .................... G01S 13/723
340/436
(Continued)

FOREIGN PATENT DOCUMENTS

CN    102036616 A    4/2011
CN    103153743 A    6/2013
(Continued)

OTHER PUBLICATIONS

Translation of International Preliminary Report on Patentability dated Nov. 23, 2017 from International Patent Application No. PCT/EP2016/000704, 7 pages.
(Continued)

*Primary Examiner* — Albert Kir
(74) *Attorney, Agent, or Firm* — Staas & Halsey LLP

(57) ABSTRACT

An image is displayed by smartglasses, the image being at least partly superimposed on a real environment of the smartglasses when the real environment is viewed through the smartglasses. In this case, the image represents an image of the real environment which is recorded by a night-vision image-recording device. The image is displayed in such a way that an image object in the recorded image, which corresponds to a real object arranged in the real environment, is displayed in the image in a manner overlapping the real object in the real environment. In the dark and in the event of poor visibility, potential hazards can be perceived significantly better by virtue of the night-vision images in (Continued)

order that additional driver-assisting information is provided and traffic safety is increased.

20 Claims, 2 Drawing Sheets

(51) Int. Cl.

| | | |
|---|---|---|
| G06T 7/00 | (2017.01) | |
| G06T 19/00 | (2011.01) | |
| H04N 5/272 | (2006.01) | |
| G02B 27/00 | (2006.01) | |
| G02B 27/01 | (2006.01) | |
| H04N 5/445 | (2011.01) | |
| G06F 3/01 | (2006.01) | |
| H04N 5/262 | (2006.01) | |
| H04N 5/33 | (2006.01) | |

(52) U.S. Cl.
CPC ..... *G02B 27/0172* (2013.01); *G02B 27/0179* (2013.01); *G06F 3/011* (2013.01); *H04N 5/2628* (2013.01); *H04N 5/33* (2013.01); *H04N 5/44504* (2013.01); *G02B 2027/014* (2013.01); *G02B 2027/0138* (2013.01); *G02B 2027/0178* (2013.01); *G02B 2027/0187* (2013.01)

(58) Field of Classification Search
USPC .......................... 348/115; 340/436; 345/633
See application file for complete search history.

(56) References Cited

U.S. PATENT DOCUMENTS

| | | | |
|---|---|---|---|
| 2014/0063064 A1* | 3/2014 | Seo | G08G 1/166 345/633 |
| 2016/0033770 A1* | 2/2016 | Fujimaki | G06T 19/006 345/8 |
| 2019/0271846 A1 | 9/2019 | Fujimaki et al. | |

FOREIGN PATENT DOCUMENTS

| | | |
|---|---|---|
| CN | 104076513 A | 10/2014 |
| DE | 10 2005 058 018 A1 | 6/2007 |
| DE | 10 2013 005 342 A1 | 9/2013 |
| DE | 10 2013 207 063 A1 | 10/2014 |
| DE | 10 2015 006 612.9 | 5/2015 |
| EP | 1 990 674 A1 | 11/2008 |
| JP | 5158063 | 12/2012 |
| WO | 2013/113500 A1 | 8/2013 |
| WO | WO PCT/EP2016/000704 | 4/2016 |

OTHER PUBLICATIONS

German Office Action dated Feb. 18, 2016 from German Patent Application No. 10 2015 006 612.9, 6 pages.
International Search Report dated Jul. 20, 2016 from International Patent Application No. PCT/EP2016/000704, 3 pages.
European Office Action dated Sep. 5, 2019 from European Patent Application No. 16720720.8, 11 pages.
Chinese Office Action dated May 12, 2020, in Chinese Patent Application No. 201680042668.X (nine pages total).

* cited by examiner

METHOD FOR OPERATING SMARTGLASSES IN A MOTOR VEHICLE, AND SYSTEM COMPRISING SMARTGLASSES

CROSS REFERENCE TO RELATED APPLICATIONS

This application is a U.S. national stage of International Application No. PCT/EP2016/000704, filed on Apr. 29, 2016. The International Application claims the priority benefit of German Application No. 10 2015 006 612.9 filed on May 21, 2015. Both the International Application and the German Application are incorporated by reference herein in their entirety.

BACKGROUND

Described herein is a method for operating smartglasses in a motor vehicle, wherein an image is displayed by the smartglasses, the image being at least partly superimposed on a real environment of the smartglasses when the real environment is viewed through the smartglasses.

In this case, smartglasses should be understood to refer to particular electronic smartglasses, such as augmented reality glasses, for example. Such glasses make it possible firstly to view the real environment and secondly to insert artificial, digital contents that are then superimposed on the view of the real environment at an appropriate point. This enables additional information to be inserted into the real environment for the user.

Precisely in the automotive sector, too, such technologies may be particularly advantageous, for example in order to provide specific additional information for the driver or passengers of motor vehicles. In the future augmented reality glasses may serve as a 360° contact analogue head-up display for the driver and passengers and thus offer an added value justifying permanent use during travel and the slight restrictions in terms of comfort that are associated therewith.

SUMMARY

It is therefore an aspect of the disclosure to provide a method for operating smartglasses in a motor vehicle and a system including smartglasses which enable improvements, in particular with regard to the provision of driver-assisting functions.

This may be achieved by a method for operating smartglasses in a motor vehicle and a system including the smartglasses.

In the method for operating smartglasses in a motor vehicle, an image is displayed by using the smartglasses, the image being at least partly superimposed on a real environment of the smartglasses when the real environment is viewed through the smartglasses. This should be understood to mean that the image is displayed in a manner superimposed on the real environment from the point of view of a user wearing the smartglasses, even if the real environment is not visible at all through the smartglasses for example owing to the superimposed representation of the image. In this case, the image represents an image of the real environment that is recorded by using a night-vision image-recording device, wherein the image is displayed in such a way that an image object recorded from an object arranged in the real environment is displayed in a manner overlapping the image in the real environment.

In this case, the method is based on the insight that the smartglasses, such as augmented reality glasses, for example, can be used not just to insert artificial, digital contents for a user, but to insert a recorded image of the environment itself, namely as a night-vision recording or night-vision image, into the real environment. This advantageously enables the driver then to be able to view through the smartglasses the scenery ahead in the night-vision mode in a manner enriched by significant information. In the dark and in the event of poor visibility, potential hazards can be perceived significantly better by virtue of the night-vision recording, which increases traffic safety primarily during night journeys. The method therefore makes it possible, by using the smartglasses, to provide additional driver-assisting information and furthermore to increase traffic safety.

The method described herein may be carried out repeatedly, that is to say that images of the environment are recorded repeatedly, e.g. periodically, by the night-vision image-recording device, e.g. in the form of a video recording, and they are displayed in the order of their recording by the smartglasses.

Furthermore, it is advantageous if the recorded image in this case is placed congruently over the real image, which is realized according to the method by virtue of the fact that the image object in a recorded image, which thus corresponds to a real object in the real environment, is displayed in a manner overlapping the latter, that is to say once again from the user's perspective or from a perspective representing the user's perspective and thus when the real environment is viewed through the smartglasses or the user looks through the smartglasses or the latter are worn. In order to insert the image object at the correct point, provision can be made for assuming and predefining a respective averaged eye position or average eye position relative to the glasses and for displaying the image object such that it is situated on an imaginary connecting line between one of these eye positions of an eye and the real object. The recorded image can also be inserted twice, once for the right eye and once for the left eye, such that the image object corresponding to one eye in the image corresponding to this eye is inserted on the connecting line between this eye and the real object and the image object corresponding to the other eye is displayed on the connecting line between this other eye and the real object. The night-vision image-recording device can also be embodied as a 3D night-vision image-recording device and include for example one stereo or two night-vision cameras that record a night-vision stereographic image, such that a 3D night-vision image is then inserted for the user. In this case, in the two images recorded by the respective cameras there is an image object which corresponds to the real object and was recorded from different perspectives. The latter are then, for example, displayed such that one is situated on an imaginary connecting line between the eye position of one eye and the real object and the other is situated on an imaginary connecting line between the eye position of the other eye and the real object. The degree of realism for the user is significantly increased by a 3D recording and display of the corresponding 3D night-vision image. Moreover, precisely when driving a motor vehicle, depth perception is particularly relevant, precisely when it is important to identify potential hazard situations as rapidly as possible and to estimate a distance from potential hazard locations as well as possible.

With respect to the night-vision image-recording device, it is possible to use for example one or more night-vision cameras and/or a night-vision system, e.g. having one or more infrared cameras having a sensitivity for different infrared wavelength ranges, e.g. a near infrared range of 780 nm to 3 μm, and/or else a thermal imaging camera, e.g. having a sensitivity for the mid-infrared range of 5 μm to 15 μm. In this way, objects in the user's real environment that normally are poorly visible or not visible at all in the dark can be made visible to the user through the glasses. This is particularly advantageous precisely in connection with the identification of persons, such as pedestrians, for example, but also of other road users, such as motor vehicles, traffic signs or road signs and the like.

Furthermore, it can also be provided that the smartglasses can be operated in two different modes, a normal mode and a night-vision mode, wherein thus in the night-vision mode the images recorded by the night-vision image-recording device are displayed in a manner superimposed on the real environment, and in the normal mode the images are not displayed and/or recorded and the night-vision image-recording device is not active in a power-saving manner. As a result, the smartglasses can be used in a manner particularly adapted to the situation. By way of example, it can also be provided that a user himself/herself can activate the night-vision mode, e.g. passes on the corresponding activation or else deactivation command via a communication connection to the smartglasses by using an operating element on the glasses or else in the motor vehicle and the motor vehicle. It is thus possible to provide operation of the smartglasses in a manner adapted to the user's requirements.

Alternatively or additionally, provision can also be made for the smartglasses to change automatically to the night-vision mode if a predetermined illuminance or ambient brightness is undershot, and/or to change to the normal mode again if the predetermined ambient brightness is exceeded. To that end, by way of example, it is also possible to use corresponding brightness sensors which are at least communicatively coupled to the smartglasses and/or the motor vehicle and can be arranged on the smartglasses and/or in/on the motor vehicle. This enables particularly convenient operation of the smartglasses since no interaction on the part of the user is thus necessary in order to enable a situation-adapted display of the images recorded by the night-vision image-recording device.

Furthermore, the night-vision image-recording device can be arranged on the smartglasses, for example in a forehead region of a user wearing the smartglasses, or between the eyes, or else two cameras above the respective eyes. These positions are particularly advantageous since the perspective of the image recorded by the night-vision image-recording device thus differs only slightly from the user's perspective, this difference being all the less significant the greater the distance between objects and the smartglasses or the user's eyes. This is usually the case primarily when a driver is driving a motor vehicle, since the driver then focuses on regions in his/her real environment, e.g. on the road, vehicles ahead, etc., which are significantly further away than just one or two meters. This in turn makes it possible for the image or images recorded by the night-vision image-recording device to be inserted directly and without being changed by the smartglasses and for a corresponding overlap with the real environment to be realized, in particular without a difference in perspective being perceptible to the user.

In a further advantageous configuration of the method, the image is displayed in real time with respect to the recording of the image, for example according to DIN ISO/IEC 2382. Corresponding designs of a system for real-time operation are known to the person skilled in the art in diverse implementations. By virtue of real-time operation, advantageously there is also no temporal offset, or at least no perceptible or significant temporal offset, between the real environment currently seen and the displayed image. This, too, once again makes it easier to ensure that recorded image and real environment overlap as far as possible identically.

In a further advantageous configuration of the method, the image object is displayed in a manner overlapping the object in the environment in such a way that when the environment is viewed through the smartglasses, a boundary of the image object corresponds to a boundary of the object of the environment at least to a predetermined tolerance deviation. By virtue of the measures described above, this can be realized in a simple manner. This configuration once again ensures that a user sees the objects displayed by the glasses also exactly at the location at which the real objects are also actually situated. The system is, for example, designed such that that the image object overlaps at least a large part of the real object and for example completely overlaps it and the deviations of the object contours and image object contours are also small.

Furthermore, it can also be provided that the image is displayed with a predetermined latency with respect to the recording of the image, wherein at least the image object is scaled depending on the predetermined latency, such that the image object is displayed in a manner overlapping the object in the environment. In this case, the predetermined latency can still be within the real-time requirement described above, or else outside this requirement. Furthermore, the latency can be determined by the smartglasses themselves, for example in an up-to-date manner for each image recording and the corresponding display of the respective image, or it is possible to predetermine an average value, for example based on empirical values or measured values. The scaling of the image object depending on the latency is particularly advantageous since possible changes in the image object, for example in terms of the size or position thereof, vis-à-vis the real object can thereby be compensated for during the latency.

Therefore, in one advantageous configuration of the method, the image object is scaled in terms of its size and/or a display position of the image object. If a driver is driving straight on in a motor vehicle, for example, and if a real object is recorded by the night-vision image-recording device and displayed as an image object with a delay, then the image object would appear smaller than the real object at the time of display. Moreover, the real object and the image object can be displaced in terms of their position relative to one another, depending on the position of the real object with respect to the direction of travel. However, with short latencies, even without scaling of the image object, such changes would be imperceptible or scarcely perceptible to a driver. It is precisely in non-real-time operation of the smartglasses, however, that such a configuration is particularly advantageous.

Particularly in this context, it is additionally advantageous if, furthermore, position information of the smartglasses in space is determined, in particular wherein the position information represents a position and/or change of position and/or orientation and/or change of orientation of the smartglasses in space, in particular with respect to the environment and/or with respect to the motor vehicle, wherein the image is displayed depending on the position information determined. The position information can be determined by the smartglasses themselves, for example, for which purpose a suitable sensor system, for example, can be provided in or on the smartglasses. However, in the motor vehicle itself it is also possible to provide a corresponding sensor system that determines the position and orientation of the smartglasses with respect to a predetermined coordinate system, e.g. a motor-vehicle-fixed coordinate system. Furthermore, additional information can also be provided by the motor vehicle, such as, for example, the current vehicle speed and/or the steering angle, or else other systems, e.g. the navigation system, of the motor vehicle are used to capture the movement of the motor vehicle in the environment, such that this information can additionally be used to determine the position and orientation of the smartglasses relative to their real environment, in particular including the environment outside the motor vehicle. All this information can thus advantageously be used to scale an image object in a suitable manner, such that the image object is displayed in a manner overlapping the real object, even when there is a temporal offset between recording and display.

However, the determination of the position information of the smartglasses has yet another great advantage, independently of the occurrence of latencies. Specifically, this additionally makes it possible to provide the night-vision image-recording device not or not only on the smartglasses, but also on the motor vehicle, for example. By virtue of the fact that the position information of the smartglasses, in particular relative to the motor vehicle, is known, by using simple mathematical transformations from the motor vehicle coordinate system into the smartglasses coordinate system, image objects in the recorded images upon display by the smartglasses can nevertheless be displayed at the correct location, namely in superimposition with the real objects.

In a further advantageous configuration of the method, the image of the environment is inserted into an entire field of view of the smartglasses, which approximates a field of view of a user wearing the smartglasses, in a manner overlapping the real image. In other words, the recorded image thereby overlaps the entire or almost the entire real environment that can be seen through the smartglasses. This overlap can also be only partly transparent, that is to say that provision can be made for the real environment, despite the inserted image, nevertheless to be visible through this displayed image. However, the image can also be inserted such that those parts of the real environment which the image overlaps are no longer visible. By inserting the image into the entire field of view of the smartglasses, it is possible particularly advantageously to maximize the additional information provided by the night recordings and thereby comprehensively to optimize the driver's view of his/her real environment which is then provided by the displayed night-vision images.

Furthermore, it can also be provided that only part of the image with the image object is inserted into only part of the field of view of the smartglasses. By way of example, it is possible to extract or to excerpt relevant objects as image objects from the recorded images and then to insert only these image objects in a manner overlapping their corresponding real objects by using the smartglasses. In this regard, by way of example, it is possible, in a targeted manner, to search for persons, other road users, motor vehicles, traffic signs and the like in the night-vision image recordings, and then to display only the image objects found in a manner superimposed on the real image. As a result, advantageously, the driver's familiar view of his/her real environment is altered as little as possible, and only relevant objects, which may constitute e.g. a possible hazard potential, are inserted by the smartglasses, which in turn, in a targeted manner, increases the driver's attention and directs it to the inserted image objects.

In addition, it is a particularly advantageous configuration of the method if the recorded image is processed before the image is displayed, such that the image object is altered in terms of its optical appearance, in particular wherein the image object is optically marked and/or highlighted and/or a contour of the image object is optically highlighted. In this way, the attention of the driver or user can be directed to the corresponding image objects in an even more targeted manner, such that precisely hazardous situations for a driver can be registered significantly more simply and more rapidly. In this case, processing the recorded image should also be understood to mean that it is possible to localize image objects in the image and an artificial digital content, such as a frame around the image object or a retraced contour of the image object, for example, can additionally be inserted in a manner corresponding to the image objects during the display of the image objects. However, it is also possible for the image data themselves to be processed, such that for example image objects are colored red in order to provide the optical marking of the image objects.

Furthermore, the method relates to a system including smartglasses, designed to display an image in such a way that the latter is at least partly superimposed on a real environment of the smartglasses when the real environment of the smartglasses is viewed through the smartglasses. Furthermore, the system may include a night-vision image-recording device designed to record the image as an image of the real environment of the smartglasses, that is to say a night-vision image of the real environment, wherein the system is furthermore designed to display the image by using the smartglasses in such a way that an image object recorded from an object arranged in the environment is displayed in the image in a manner overlapping the object in the environment.

The features, feature combinations and advantages thereof mentioned for the method as described herein and the configurations thereof are applicable in the same way to the system described herein. Furthermore, the method operations mentioned in association with the method described herein and the configurations thereof enable the development of the system described herein by further substantive features.

Further advantages, features and details of the method and system will become apparent from the following description of preferred exemplary embodiments and with reference to the drawings. The features and feature combinations mentioned above in the description and the features and feature combinations mentioned below in the description of the drawings and/or shown solely in the drawings can be used not only in the combination respectively indicated, but also in other combinations or by themselves, without departing from the scope of the disclosure.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
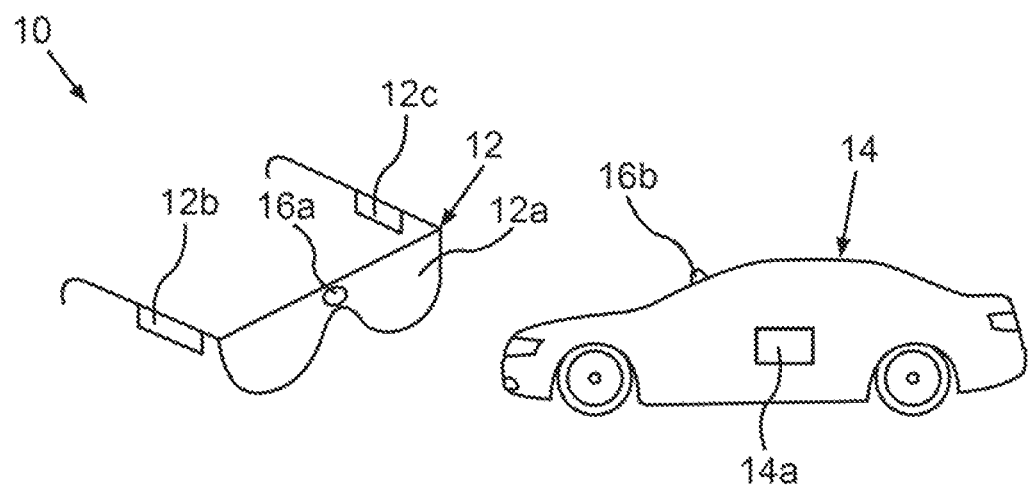
FIG. 1 is a schematic illustration of a system including smartglasses and a motor vehicle in which the smartglasses are intended to be operated, in accordance with one exemplary embodiment.

Reference will now be made in detail to preferred embodiments, examples of which are illustrated in the accompanying drawing, wherein like reference numerals refer to like elements throughout.

FIG. 1 shows a schematic illustration of a system 10 including smartglasses 12 and a motor vehicle 14 in which the smartglasses 12 are intended to be operated. The smartglasses 12 have a display area 12a, which is embodied here by way of example as spectacle lenses, but could also be embodied for example as displays having a variable degree of transparency or else in a different way. When the smartglasses 12 are worn by a user, the real environment of the smartglasses 12 can thus be visible to the user through the display area 12a. In addition, the smartglasses 12 have a control device 12b for driving the smartglasses 12, wherein a projection module of the smartglasses 12 can also be provided, for example, by using which images can be inserted in superimposition with the real environment by using projection via the display area 12a. Alternatively, provision can also be made for the control device 12b to directly drive the display area 12a, if the latter is embodied as a display, for example, in order to insert images or objects in superimposition with the real environment by using the smartglasses 12.

Furthermore, the system 10 has a night-vision image-recording device, in particular in the form of a night-vision camera 16a, which is arranged on the smartglasses 12 in this example. By using the night-vision camera 16a, night-vision images from the real environment can advantageously be recorded and be displayed to the user via the display area 12a, wherein in particular the recorded night-vision images are placed congruently over the real image, i.e. the view of the real environment. As a result, it is advantageously possible to make available to a driver through the glasses 12 the scenery ahead in the night-vision mode in a manner enriched by significant information, which in particular allows the driver to react faster and immediately in the event of hazards. Moreover, the smartglasses 12 can have a position determining and tracking device 12c. This position determining device 12c makes it possible to determine and to track head movements of a user wearing the smartglasses 12. In particular, the position determining device 12c in this case is designed to detect and evaluate the position and orientation of the smartglasses 12 and also changes in position and/or changes in orientation with respect to a predetermined coordinate system, e.g. one fixed with respect to the real environment. This makes it possible, even during travel and in the event of head movements of the user, and also possibly in the case of latencies between recording a respective night-vision image and displaying the latter, that the night-vision image can be placed congruently over the real image. The night-vision image is thus displayed in such a way that an image object recorded from an object arranged in the real environment is displayed in the night-vision image in a manner overlapping the object in the real environment.

Since the smartglasses 12 are provided for use in a motor vehicle 14, it is advantageously furthermore possible, then, for specific functions also to be provided by the motor vehicle 14 itself. By way of example, the night-vision image-recording device of the system 10, for example likewise in the form of a night-vision camera 16b, can be arranged on the motor vehicle 14. Furthermore, the motor vehicle 14 can also have a control and communication module 14a, which enables communication with the smartglasses 12, which then for example likewise have such a communication device. As a result, by way of example, the night-vision images recorded by the night-vision camera 16b on the motor vehicle can be communicated to the smartglasses 12 and be displayed by the latter. Furthermore, a tracking device can also be provided in the motor vehicle 14, the tracking device making it possible to determine the position and orientation of the smartglasses 12 relative to the motor vehicle. Moreover, further motor vehicle data can be used, such as, for example, the driving speed or image data recorded by further cameras of the motor vehicle, in order to be able to determine the position, movement and orientation of the motor vehicle 14 and thus also of the smartglasses 12 relative to the environment. All these data can advantageously be used to represent the night-vision images recorded by the night-vision camera 16a, 16b at the correct location on the display area 12a.

In this case, transferring specific functionalities to the motor vehicle 14 has the major advantage that this reduces the weight and size of the smartglasses 12, which in turn increases the wearing comfort. Furthermore, computational capacities of the motor vehicle 14 can be utilized in a targeted manner for specific functions that require a great deal of computational complexity. Moreover, already existing devices of the motor vehicle 14, such as, for example, cameras and information systems or else communication systems, can advantageously be utilized.

Figure 2:
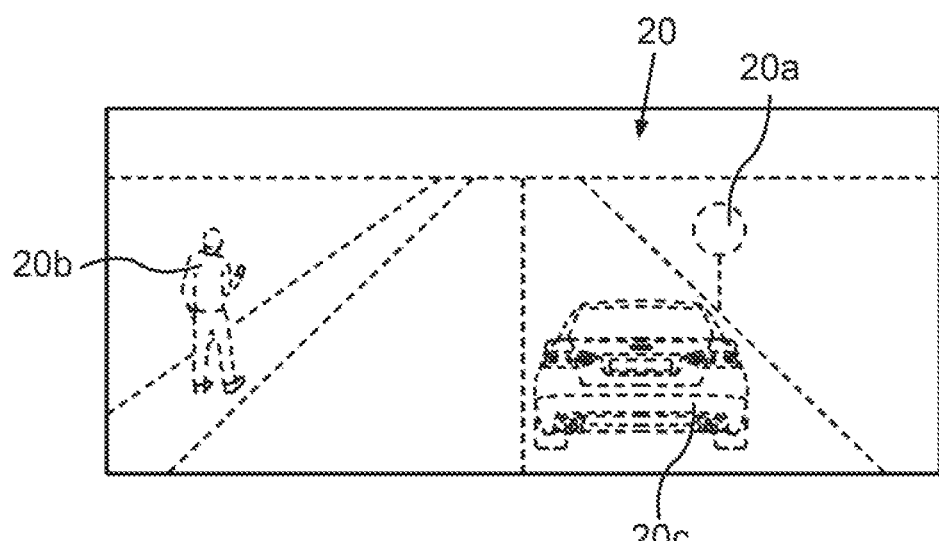
FIG. 2 is a schematic illustration of a real environment of the smartglasses in the dark.

FIG. 2 shows a schematic illustration of a real environment 20, for example at night or twilight, from the point of view of a driver. Under certain circumstances at night or when there is inadequate lighting, objects 20a, 20b, 20c in the environment 20 may be only poorly discernible or not discernible at all to a driver, which is intended to be made clear by the dashed lines. The recording of night-vision images and the display thereof by the smartglasses 12 advantageously make it possible, then, for precisely the objects 20a, 20b, 20c, such as, for example, persons 20b, other road users, such as, for example, motor vehicles 20c, or road signs 20a, to be made visible significantly better, which is intended to be illustrated with reference to FIG. 3 and FIG. 4.

Figure 3:
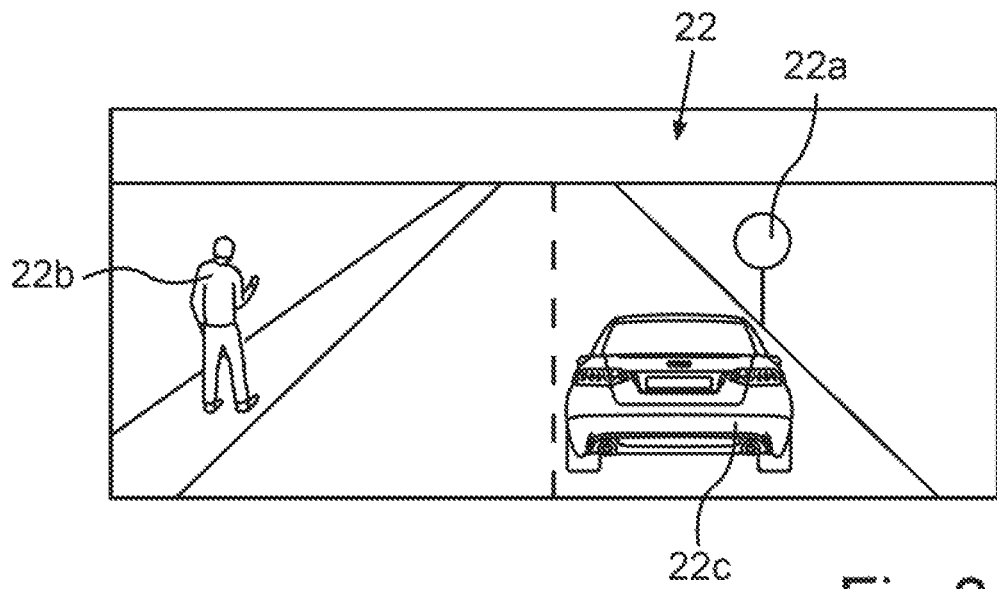
FIG. 3 is a schematic illustration of an image of the real environment which is recorded by using a night-vision image-recording device and which is displayed in superimposition with the real environment by using the smartglasses.

In this case, FIG. 3 shows a schematic illustration of an image which is recorded by the night-vision camera 16a, 16b and which is displayed in superimposition with the real environment 20 by using the smartglasses 12. In this example, the night-vision image 22 is inserted completely into the field of view of the driver or of the smartglasses 12. Many pieces of information of the real environment 20 can be made visible to the driver significantly better in this way. In particular relevant objects 20a, 20b, 20c of the real environment 20 can be made visible significantly better by the representation of the corresponding night-vision image 22 with the corresponding image objects 22a, 22b and 22c.

Figure 4:
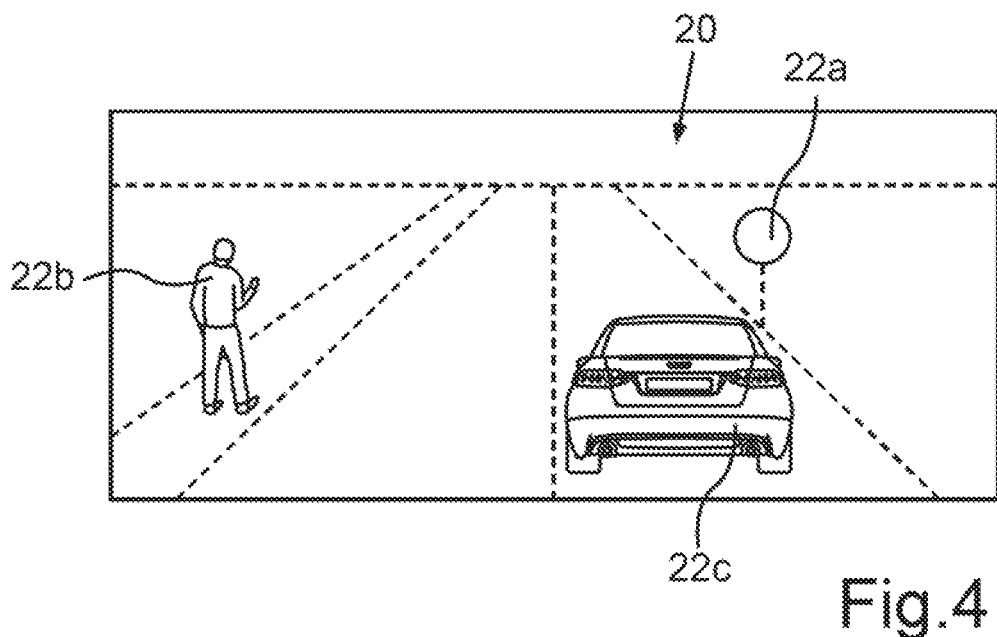
FIG. 4 is a schematic illustration of the image recorded by the night-vision image-recording device and displayed by using the smartglasses, wherein only predetermined image objects in the recorded image are displayed in superimposition with the real environment by using the smartglasses.

FIG. 4 here shows a further exemplary embodiment, in which now only the relevant image objects 22a, 22b and 22c are inserted, rather than the entire recorded night-vision image 22, via the smartglasses 12. The driver or user of the smartglasses 12 thus sees his/her real environment 20 unchanged, the night-vision recordings of specific objects 20a, 20b and 20c now being inserted as corresponding image objects 22a, 22b and 22c into the real environment. As a result, the driver can advantageously be made aware of relevant objects in his/her real environment 20. In addition, it is also possible for these relevant objects 22a, 22b and 22c, by using corresponding image processing, additionally to be optically highlighted, marked, intensified in terms of contours or highlighted in color, in order to make the driver even more aware of possible hazards.

The described recorded night-vision images or the image objects 22a, 22b, 22c thereof are, for example inserted in real time by using the smartglasses 12, in particular as a 2D image or else as a 3D image, at the correct location, i.e. congruently with the respectively corresponding real objects 20a, 20b, 20c. Furthermore, provision can also be made for providing different operating modes for the smartglasses 12, such that the night-vision images 22 are inserted only in a night-vision mode of the smartglasses 12. Moreover, provision can be made of operating elements on the smartglasses 12 and/or in the motor vehicle 14, by which operating elements the smartglasses 12 can be operated and, in particular, the night-vision mode can be activated and deactivated. Alternatively or additionally, sensors, for example brightness sensors, can also be provided in order to automatically activate the night-vision mode in appropriate darkness.

Overall, a method for operating smartglasses and a system including smartglasses are thus provided which make it possible, by displaying night-vision images in a manner overlapping a real image of an environment, to improve the driver's view at night, to provide helpful and driver-assisting functions, and thus to make the driver aware primarily of potential hazardous situations.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating smartglasses worn by a user in a motor vehicle, comprising:
    recording, by a night-vision image-recording device, an image of a real environment as viewed through the smartglasses, the real environment including a real object;
    determining, by a controller, a predetermined change in time, wherein the predetermined change is a time difference between a time when the image of the real environment including the real object was recorded and a time when a scaled image object is to be displayed by the smartglasses;
    generating, by the controller, a processed image of the image of the real environment by scaling an image object from the image of the real environment to obtain the scaled image object, the image object being scaled according to the predetermined change in time and a movement direction of the motor vehicle, and the image object corresponding to the real object from the real environment; and
    displaying, by the smartglasses, at least part of the processed image so as to be at least partly superimposed on the real environment when the real environment is viewed through the smartglasses, and so that the scaled image object is displayed in a manner overlapping the real object in the real environment when the real object is viewed through the smartglasses.

2. The method as claimed in claim 1, wherein displaying the at least the part of the processed image comprises displaying the at least the part of the processed image in real time.

3. The method as claimed in claim 1, wherein displaying the at least the part of the processed image comprises displaying the scaled image object in a manner overlapping the corresponding real object in the real environment in such a way that when the real environment is viewed through the smartglasses, a boundary of the scaled image object corresponds to a boundary of the corresponding real object of the real environment at least to a predetermined tolerance deviation.

4. The method as claimed in claim 1, wherein scaling the image object comprises scaling the image object in terms of at least one of size and a display position.

5. The method as claimed in claim 1, wherein displaying the at least the part of the processed image comprises inserting the processed image into an entire field of view of the smartglasses, which approximates a field of view of the user wearing the smartglasses, in a manner overlapping the real environment.

6. The method as claimed in claim 1, wherein displaying the at least the part of the processed image comprises inserting only a part of the processed image that includes the scaled image object into a first part of a field of view of the smartglasses such that the first part of the field of view of the smartglasses includes the part of the processed image that includes the scaled image object and a second part of the field of view of the smartglasses excludes the processed image.

7. The method as claimed in claim 1, wherein generating the processed image further comprises altering the image object in terms of an optical appearance of the image object.

8. The method as claimed in claim 7, wherein altering the image object includes at least one of optically marking the image object, highlighting the image object, and optically highlighting a contour of the image object.

9. The method as claimed in claim 1, further comprising determining position information of the smartglasses in space with respect to at least one of the real environment and the motor vehicle, and
    wherein displaying the at least the part of the processed image comprises displaying the at least the part of the processed image based on the position information of the smartglasses.

10. The method as claimed in claim 9, wherein
    the position information of the smartglasses represents at least one of a position, change of position, orientation, and change of orientation of the smartglasses in space, with respect to at least one of the real environment and the motor vehicle, and
    scaling the image object image comprises scaling the image object based on the position information of the smartglasses.

11. A system, comprising:
smartglasses, wearable by a user;
a night-vision image-recording device configured to record an image of a real environment as viewed through the smartglasses, the real environment including a real object; and
a controller configured to determine a predetermined change in time, wherein the predetermined change is a time difference between a time when the image of the real environment was recorded and a time when a scaled image object is to be displayed by the smartglasses, and to generate a processed image of the image of the real environment by scaling an image object from the image of the real environment to obtain the scaled image object, the image object being scaled according to the predetermined change in time and a movement direction of the a motor vehicle, and the image object corresponding to the real object from the real environment, and
the smartglasses are configured to display at least part of the processed image so as to be at least partly superimposed on the real environment when the real environment is viewed through the smartglasses, and so that the scaled image object is displayed in a manner overlapping the real object in the real environment when the real object is viewed through the smartglasses.

12. The system as claimed in claim 11, further comprising the motor vehicle,
wherein
the night-vision image-recording device includes at least one of an infrared camera and a thermal imaging camera, and
the night-vision image-recording device is disposed on at least one of the smartglasses and the motor vehicle.

13. The system as claimed in claim 11, wherein
the smartglasses are configured to be operable in a first mode and a second mode,
in the first mode, the smartglasses are configured to not display the at least the part of the processed image and/or the night-vision image-recording device is deactivated so as to reduce a power consumption of the night-vision image recording device, and
in the second mode, the smartglasses are configured to display the at least the part of the processed image and the night-vision image-recording device is activated.

14. The system as claimed in claim 13, further comprising:
the motor vehicle; and
a brightness sensor communicatively coupled to at least one of the motor vehicle and the smartglasses, and
wherein the smartglasses are configured to switch from the first mode to the second mode when a brightness value sensed by the brightness sensor is less than a predetermined brightness value.

15. The system as claimed in claim 11, wherein the smartglasses are configured to display the at least the part of the processed image by inserting the processed image into at least a part of a field of view of the smartglasses, which approximates a field of view of the user wearing the smartglasses, in a manner overlapping the real environment.

16. The system as claimed in claim 11, wherein the smartglasses are configured to insert only a part of the processed image that includes the scaled image object into a first part of a field of view of the smartglasses such that the first part of the field of view of the smartglasses includes the part of the processed image that includes the scaled image object and a second part of the field of view of the smartglasses excludes the processed image.

17. The system as claimed in claim 11, further comprising the motor vehicle,
wherein
the controller is disposed in at least one of the motor vehicle and the smartglasses, and
the controller is further configured to generate the processed image by at least one of optically marking the image object, highlighting the image object, and optically highlighting a contour of the image object.

18. The system as claimed in claim 11, wherein the predetermined change in time is determined based on an empirical or measured value.

19. The system as claimed in claim 11, further comprising the motor vehicle,
wherein
the controller is configured to increase a size of the image object so that a size of the scaled image object is substantially equal to a size of the real object as viewed through the smartglasses at a time the scaled image object is displayed, when the predetermined change in time exceeds a threshold value, and
the controller increases the size of the image object based on at least one of a speed of the motor vehicle and a steering angle of the motor vehicle.

20. A motor vehicle to communicate with smartglasses, the motor vehicle comprising:
a chassis;
a night-vision image-recording device configured to record an image of a real environment as would be viewed through the smartglasses, the real environment including a real object; and
a controller configured to:
determine a predetermined change in time, wherein the predetermined change is a time difference between a time when the image of the real environment was recorded and a time when a scaled image object is to be displayed by the smartglasses,
generate a processed image of the image of the real environment by scaling an image object from the image of the real environment to obtain the scaled image object, the image object being scaled according to the predetermined change in time, and the image object corresponding to the real object from the real environment, and
transmit at least part of the processed image to the smartglasses so that the at least the part of the processed image can be displayed at least partly superimposed on the real environment when the real environment is viewed through the smartglasses, and so that the scaled image object can be displayed in a manner overlapping the real object in the real environment when the real object is viewed through the smartglasses.

* * * * *

UNITED STATES PATENT AND TRADEMARK OFFICE
CERTIFICATE OF CORRECTION

PATENT NO. : 10,868,976 B2
APPLICATION NO. : 15/575689
DATED : December 15, 2020
INVENTOR(S) : Marcus Kuehne Page 1 of 1

It is certified that error appears in the above-identified patent and that said Letters Patent is hereby corrected as shown below:

In the Claims

Column 11, Line 17 (approx.), In Claim 11, before "a" delete "the".

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*